(12) United States Patent
Van Der Meijden et al.

(10) Patent No.: US 8,728,406 B2
(45) Date of Patent: May 20, 2014

(54) DISPENSERS ESPECIALLY ADAPTED FOR USE IN VESSELS SUCH AS SWIMMING POOLS AND SPAS

(76) Inventors: Hendrikus Johannes Van Der Meijden, Midrand (ZA); Alexis Adrian Felipe Wadman, Amstelveen (NL); Robin Owen Ellis, Pine Ridge, FL (US)

(\*) Notice: Subject to any disclaimer, the term of this patent is extended or adjusted under 35 U.S.C. 154(b) by 838 days.

(21) Appl. No.: 12/898,793

(22) Filed: Oct. 6, 2010

(65) Prior Publication Data
US 2011/0089121 A1    Apr. 21, 2011

Related U.S. Application Data

(60) Provisional application No. 61/248,941, filed on Oct. 6, 2009.

(51) Int. Cl.
*C02F 1/76* (2006.01)
*B01F 3/12* (2006.01)

(52) U.S. Cl.
USPC ........... 422/263; 422/265; 422/270; 422/272; 422/275; 137/268; 210/206; 210/242.1

(58) Field of Classification Search
USPC ............ 210/749, 753, 754, 756, 764, 167.11, 210/167.3, 205, 242.1, 206; 422/263, 264, 422/265, 276, 277, 278; 137/268
See application file for complete search history.

(56) References Cited

U.S. PATENT DOCUMENTS

| | | | |
|---|---|---|---|
| 2,826,484 A \* | 3/1958 | Buehler | 422/265 |
| 4,473,533 A | 9/1984 | Davey | |
| 4,643,881 A | 2/1987 | Alexander et al. | |
| 4,702,270 A \* | 10/1987 | King, Sr. | 422/265 |
| 5,795,551 A | 8/1998 | Powell | |

\* cited by examiner

*Primary Examiner* — Lucas Stelling
(74) *Attorney, Agent, or Firm* — Kilpatrick Townsend & Stockton LLP; Dean W. Russell, Esq.

(57) ABSTRACT

Dispensers, principally of water-treatment chemicals, are detailed. The floating dispensers may be inherently unstable in use, rotating approximately ninety degrees (from a generally vertical position to a generally horizontal one) over the useful lifespan of the chemicals initially contained within. Movement of the dispensers to horizontal positions signals users to replace the depleted chemicals. The dispensers also may be stacked into smaller volumes for transit and storage and need not include a separate component for flow adjustment. Rotation of its components additionally may create a "dial-a-dosage" feature of the dispenser, effectively varying depletion rate of the chemicals contained therein.

10 Claims, 6 Drawing Sheets

DISPENSERS ESPECIALLY ADAPTED FOR USE IN VESSELS SUCH AS SWIMMING POOLS AND SPAS

CROSS-REFERENCE TO RELATED APPLICATION

This application claims the benefit of U.S. Provisional Application No. 61/248,941 entitled "Dispensers Especially Adapted For Use In Vessels Such As Swimming Pools And Spas" filed on Oct. 6, 2009, the contents of which are incorporated herein by reference.

FIELD OF THE INVENTION

This invention relates to dispensers and more particularly, although not necessarily exclusively, to free-floating dispensers of chemicals used to treat water in vessels such as, but not limited to, swimming pools and spas.

BACKGROUND OF THE INVENTION

U.S. Pat. No. 5,795,551 to Powell illustrates a floating chemical dispenser for use in pools. The device exemplifies those having "mushroom" shapes, in that "a float member having a larger diameter than the floating dispenser is attached to the top end [of] the container." See Powell, col. 4, 11. 45-47 (numerals omitted). A principal function of the larger-diameter float member is to stabilize the device. As noted in the Powell patent, "[t]he float member and the floating dispenser . . . are cooperatively defined to keep the floating dispenser erect and upright in the pool water . . . irrespective of the quantity of the contents in the container." See id., 11. 49-54 (numerals omitted).

Another example of a floating chemical dispenser is depicted in U.S. Pat. No. 4,473,533 to Davey. Although not of mushroom shape, the dispenser of the Davey patent likewise is designed to remain stable and upright in the pool water. According to the Davey patent, "[b]y experience, the user will know [when] the container [rises] above the surface of the water to greater than a predetermined height, that the quantity of [the chemical] has been substantially depleted and must be replaced." See Davey, col. 2, 1. 65 to col. 3, 1. 2 (numerals omitted).

U.S. Pat. No. 4,643,881 to Alexander, et al. discloses an example of a chemical dispenser which floats only when the chemical is depleted. In normal use, the dispenser rests vertically upright on a support shelf well below the water surface within the pool. As substantially all of the chemical within the dispenser dissolves, the dispenser begins to rise toward the water surface, inverting (i.e. rotating one hundred eighty degrees) as it rises. The result is that the dispenser remains in a vertical position following the inversion, albeit with its bottom floating above the water surface to alert a user that the chemical is depleted.

SUMMARY OF THE INVENTION

Unlike the dispensers discussed above, those of the present invention are not intended to remain vertically oriented at all times. Instead, they are inherently unstable, tending to rotate approximately ninety degrees (moving from a generally vertical position to a generally horizontal one) as chemicals are depleted from within. The dispensers are immediately identifiable as needing replacement chemicals whenever they appear on their sides (i.e. in horizontal positions).

At least some embodiments of the dispensers include interlocking upper and lower members. A float may be positioned in the uppermost part of the upper member, while chemicals to be dispensed may be positioned in the remainder of the upper member or in the lower member (or in both areas). In these embodiments, the chemicals preferably are solid and vertically aligned with the floats within the dispensers. The chemicals need not necessarily be solid or be positioned in this manner, however.

Both the upper member and the lower member may be elongated. The lower member preferably is generally cylindrical in shape with a solid bottom. By contrast, the upper member preferably may be somewhat conical in shape. Furthermore, the cross-sectional diameter of much of the upper member beneficially may be less than the cross-sectional diameter of the lower member, so that much of the upper member may fit within the lower member prior to use. This "stacking" of the upper and lower members significantly reduces the amount of space required to transport, store, and display the dispensers both prior to purchase and otherwise when not in use.

The interlock, or interface, between the upper and lower members additionally may function as a flow adjustment mechanism for the dispensers of the present invention. Unlike many other dispensers, which utilize a separate (additional) component to adjust flow, those of the present invention may operate without such a component. Instead, interfacing portions of both the upper and lower members may contain openings. As the members engage, one may be rotated relative to the other to align (or misalign) various of the openings as desired. Depending on the number of aligned openings of the upper and lower members, fluid flow through a dispenser may be increased or decreased.

It thus is an optional, non-exclusive object of the present invention to provide dispensers.

It is an additional optional, non-exclusive object of the present invention to provide dispensers principally intended to supply water-treatment chemicals to bodies of water within, for example, pools and spas.

It is a further optional, non-exclusive object of the present invention to provide floating dispensers that are inherently unstable in use.

It is also an optional, non-exclusive object of the present invention to provide floating dispensers that rotate approximately ninety degrees in use, from a generally vertical position to a generally horizontal position, as chemicals within the dispensers are depleted.

It is, moreover, an optional, non-exclusive object of the present invention to provide floating dispensers in which one member may fit within another when not in use.

It is another optional, non-exclusive object of the present invention to provide floating dispensers in which an upper member is somewhat conical in shape and a lower member is generally cylindrical in shape with a solid bottom.

It is, furthermore, an optional, non-exclusive object of the present invention to provide floating dispensers with upper and lower members and in which no additional component is required to adjust flow therethrough.

It is yet another optional, non-exclusive object of the present invention to provide floating dispensers in which interfacing portions of the upper and lower members contain openings which may be aligned (or misaligned) in use to provide flow adjustment.

It is an additional optional, non-exclusive object of the present invention to provide floating dispensers incorporating thermometers thereon or therein.

DETAILED DESCRIPTION

Figure 1:
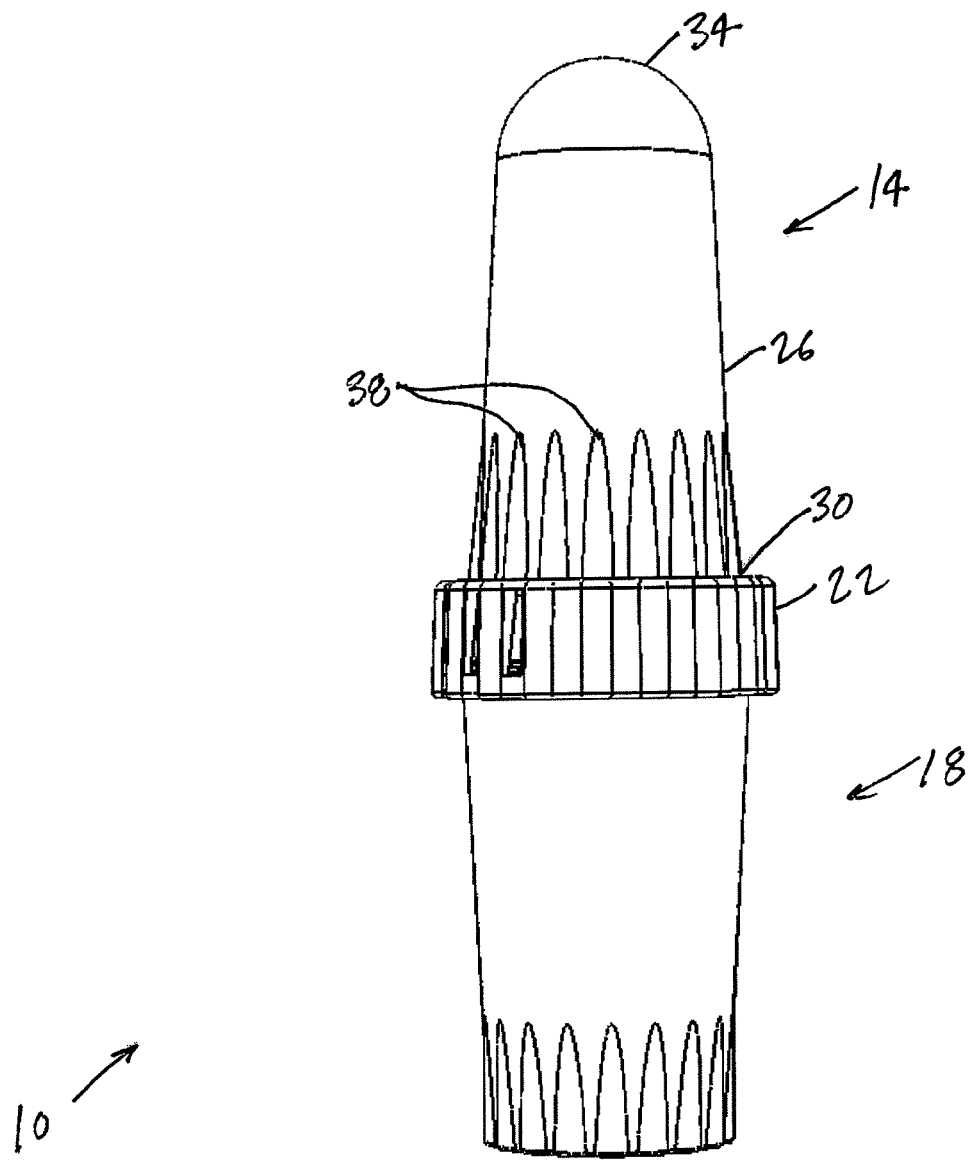
FIG. 1 is an elevational view of an exemplary dispenser consistent with the present invention.
Figure 2:
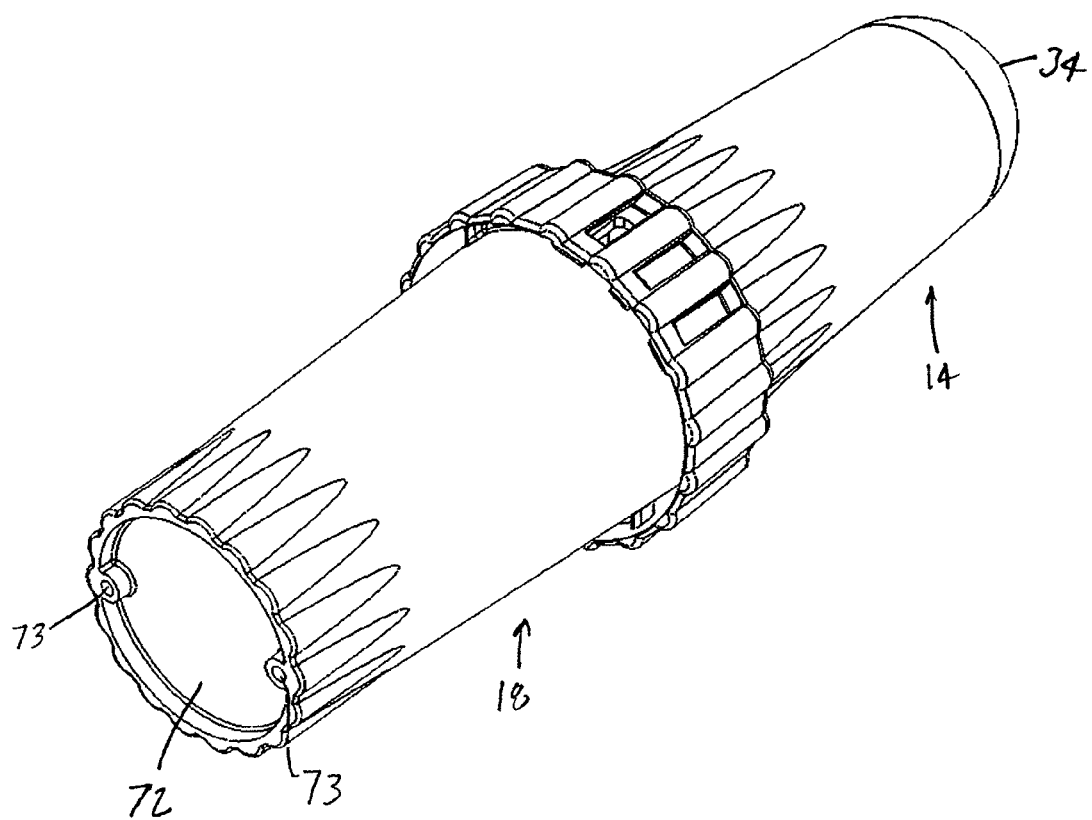
FIG. 2 is a perspective view of the dispenser of FIG. 1.

Shown in FIGS. 1-3 and 6 is exemplary dispenser 10 consistent with the present invention. Dispenser 10 preferably is used as part of a water-treatment system for recreational or therapeutic bodies of water within swimming pools, spas, or hot tubs. Use of dispenser 10 is not limited to these bodies, however, nor is use of dispenser 10 limited to water-treatment activities. Nevertheless, at least some versions of dispenser 10 are configured to contain solid forms of one or more chemicals such as chlorine, bromine, or other mineral-, metal-, or non-mineral water-sanitizing agents. In particular, some versions of dispenser 10 are especially suited to contain chlorine or bromine tablets.

Dispenser 10 may comprise as few as two components—upper member 14 and lower member 18. Members 14 and 18 preferably may attach (see FIGS. 1-3) for use. Otherwise, members 14 and 18 may be detached (see FIGS. 4-6) for transport, storage, display, when replacing depleted chemicals, or otherwise as desired. Although not presently preferred by applicants, dispenser 10 may comprise additional components if or as necessary. As an example, a thermometer may be incorporated onto, into, or within dispenser 10.

Upper member 14 may be elongated and comprise first and second portions 22 and 26. Second portion 26, in particular, may assume a generally conical external shape, tapering in diameter from first end 30 (adjacent first portion 22) to second end, or top, 34, which may be rounded if desired. One or more ribs 38 may (but need not necessarily) be present in second portion 26 for strength, to facilitate molding, or as gripping surfaces when attaching or detaching members 14 and 18.

Figure 3:
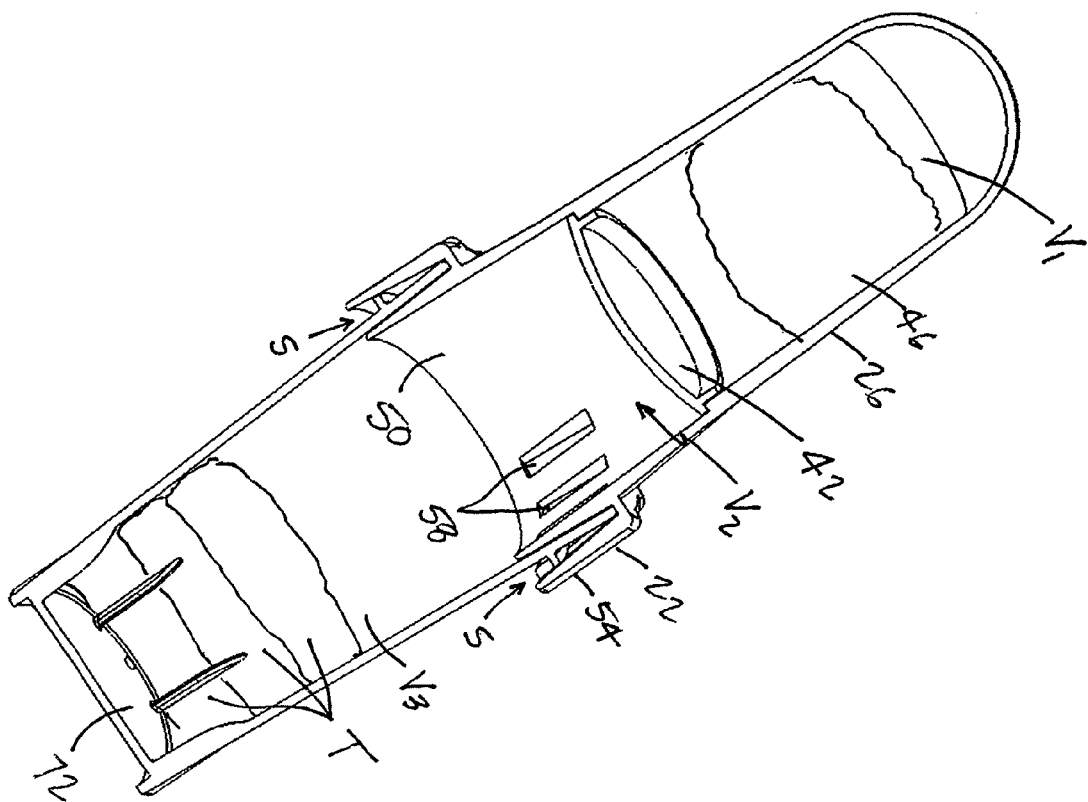
FIG. 3 is a cross-sectional view of the dispenser of FIG. 1.

As illustrated in FIG. 3, second portion 26 may define interior volumes $V_1$ and $V_2$ separated by divider 42. Float 46 may be inserted into second portion 26 so as to fill part or all of interior volume $V_1$; thereafter, divider 42 may be glued, welded, or otherwise connected to second portion 26 to retain float 46 within the volume $V_1$. Alternatively, float 46 may itself be directly attached to second portion 26. If present, divider 42 may in some cases be removable, although presently preferred by applicants is that divider 42 be permanently affixed (so that float 46 is inaccessible to a user and isolated from the fluid in which dispenser 10 is placed). In either circumstance, float 46 beneficially may be any object or material more buoyant than the fluid in which dispenser 10 is placed, so that at least part of dispenser 10 floats on the surface of the fluid. Indeed, float 46 need not necessarily be solid, but rather may be gaseous (e.g. air) or liquid if appropriate or desired.

First portion 22 may be double walled, with first wall 50 extending from second portion 26 and second wall 54 protruding outward therefrom. Annular space S between first and second walls 50 and 54 thus forms an interfacing region in which lower member 18 may be received in use. Present in each of first and second walls 50 and 54 are openings, with those in first wall 50 denoted openings 58 and those in second wall 54 denoted openings 62. Each opening 58 preferably is aligned with a corresponding opening 62 to create a potential fluid entrance to, or exit from, upper member 14.

Presently-preferred versions of dispenser 10 include two sets of three openings 58 (totaling six openings 58), with the sets spaced approximately one-hundred eighty degrees about the circumference of first wall 50. These versions of dispenser 10 likewise include two corresponding sets of three openings 62 (totaling six openings 62), with the sets spaced approximately one-hundred eighty degrees about the circumference of second wall 54. Persons skilled in the appropriate art will, however, recognize that more or fewer openings 58 and 62 may be utilized instead.

Figure 4:
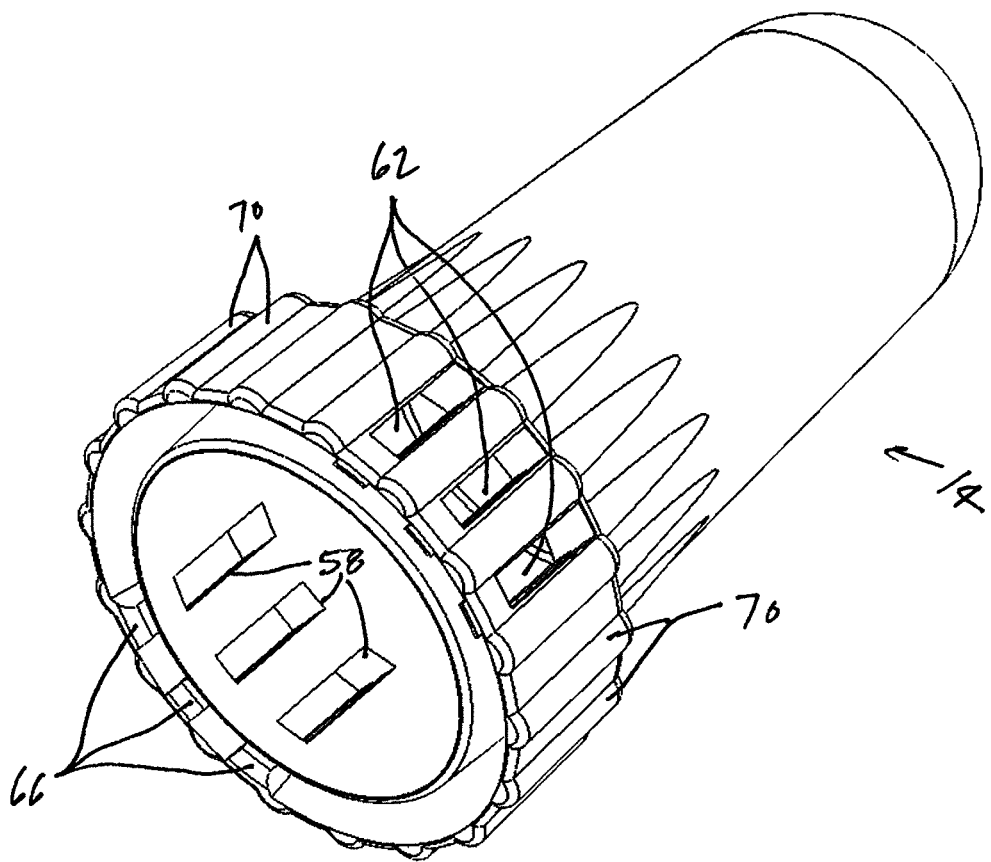
FIG. 4 is a perspective view of an upper member of the dispenser of FIG. 1.
Figure 5:
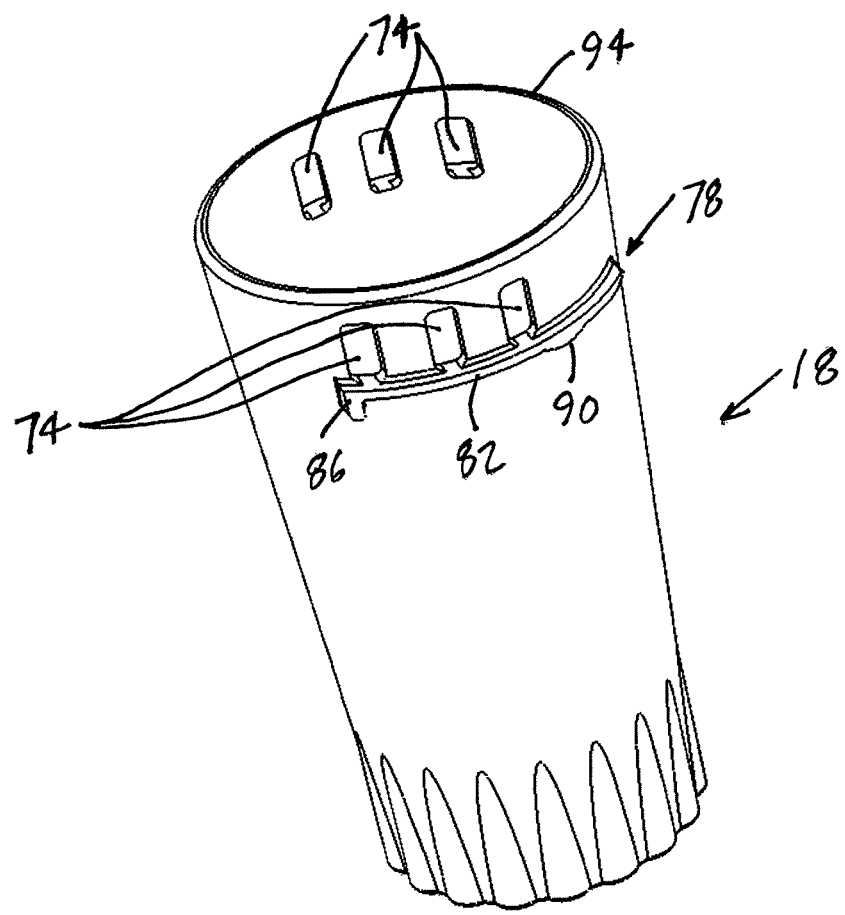
FIG. 5 is a perspective view of a lower member of the dispenser of FIG. 1.

Protruding (inward) from second wall 54 into space S beneath openings 62 may be one or more locking flanges 66 (see FIG. 4). Protruding (outward) from the second wall 54 may be ribs 70. Ribs 70 are not required, however, and other locking mechanisms may substitute for flanges 66.

Lower member 18 (FIGS. 1-3 and 5-6) too may be elongated and preferably is generally cylindrical in shape, terminating in floor 72. Defined by member 18 is volume $V_3$. Chemical tablets T or other water-treatment chemicals may be positioned within volume $V_3$ as well as in volume $V_2$ of second portion 26. Thus, when dispenser 10 is upright (vertical) as shown in FIG. 1, tablets T are beneath, and generally vertically aligned with, float 46. Floor 72 may include one or more (small) holes 73 preferably open at all times, allowing water to fill and drain from member 18.

Figure 6:
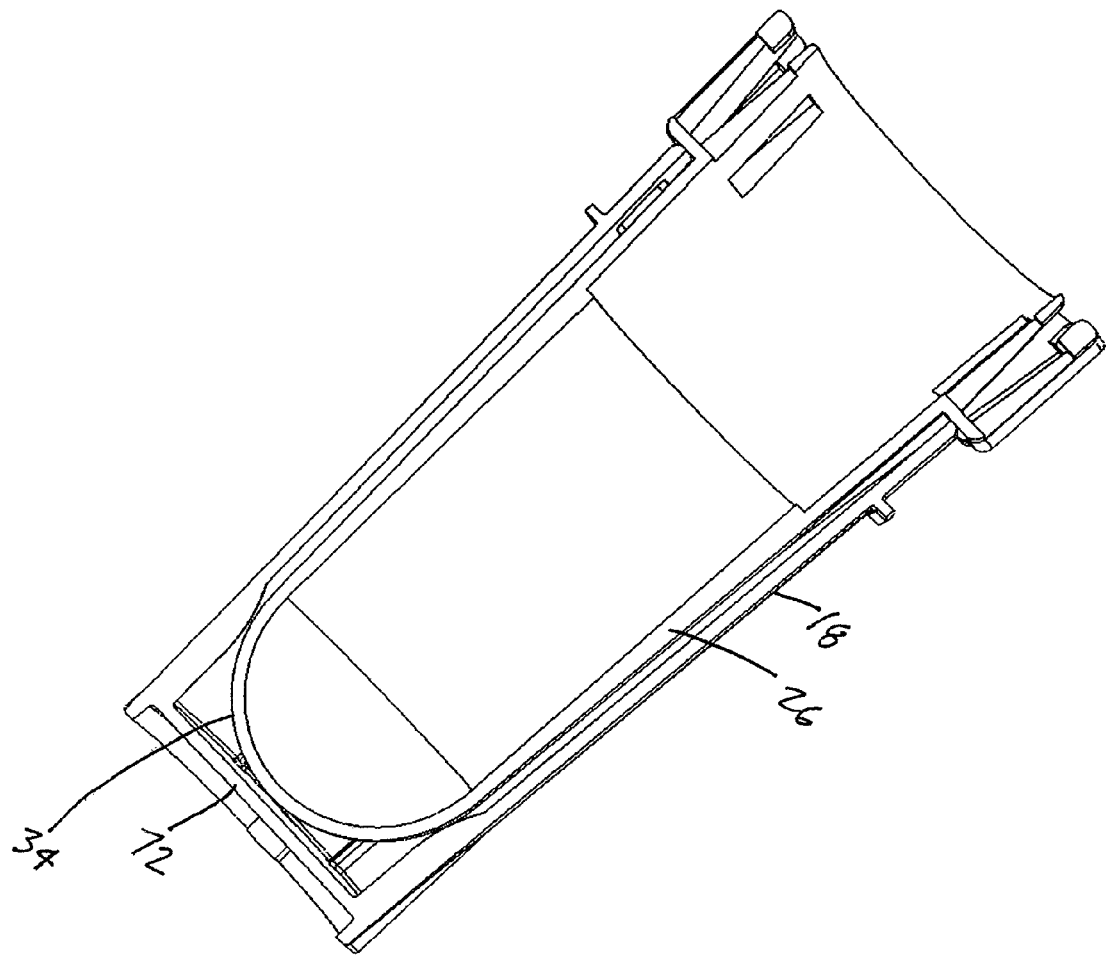
FIG. 6 is a cross-sectional view of the dispenser of FIG. 1 with the upper member fitted within the lower member.

The diameter of lower member 18 preferably is slightly larger than the maximum diameter of second portion 26. Accordingly, as shown in FIG. 6, upper member 14 may be inverted and inserted into volume $V_3$ when dispenser 10 is not in use. This insertion significantly reduces the overall size of dispenser 10 for, e.g., transport and storage and otherwise when not in use.

In presently-preferred versions of dispenser 10, lower member 18 includes two sets of three openings 74 (totaling six openings 74), again with the sets spaced approximately one-hundred eighty degrees about its circumference. More or fewer openings 74 may exist; however, it may be advantageous for the total number of openings 74 to equal each of the total number of openings 58 and the total number of openings 62.

Extending outward from lower member 18 beneath each set of openings 74 is flange 78, which may comprise first part 82 and second part 86. First part 82 may be horizontal when dispenser 10 is upright, whereas second part 86 may be vertical when dispenser 10 is upright. Extending downward from first part 82 is bulge 90.

To attach upper and lower members 14 and 18, edge 94 of lower member 18 may be slid upward into space S with locking flanges 66 disengaged from flanges 78. In this position, openings 74 are not aligned with openings 58 and 62, effectively preventing any fluid flow through dispenser 10. Lower member 18 may then be rotated relative to upper member 14, so that locking flanges 66 pass beneath first parts 82, until a locking flange 66 contacts bulge 90. To this point openings 74 remain misaligned with openings 58 and 62 in preferred versions of dispenser 10.

Application of manual force may then cause a locking flange 66 to bear against and pass by bulge 90. At this point, one of each set of openings 74 is aligned with corresponding openings 58 and 62. Stated differently, an opening 74 is aligned with an opening 58 and an opening 62 on each side of dispenser 10, so that a total of two aligned sets of openings 74, 58, and 62 exist.

Further rotation causes another locking flange 66 to encounter, and then pass by, bulge 90. At this point, four aligned sets of openings 74, 58, and 62 exist. This greater number of sets of openings allows for greater flow into and from the dispenser 10. Yet further rotation causes a third locking flange 66 to encounter, and then pass by, bulge 90, creating six aligned sets of openings 74, 58, and 62 to exist. This rotation also may cause a locking flange 66 to contact each second part 86, which operates to stop further rotation. The rotation also, in essence, provides dispenser 10 with a "dial-a-dosage" feature, as the depletion rate of tablets T or other chemicals will, at least in general, be a function of the number of aligned sets of openings.

Once a locking flange 66 has passed by bulge 90, upper and lower members 14 and 18 are interlocked for use. However, members 14 and 18 may be separated again by counter-rotation, with manual force again necessary to cause locking flanges 66 to bear against and pass by bulges 90. After rotation sufficient to disengage locking flanges 66 from flanges 78, lower member 18 may be pulled away from upper member 14 (or vice-versa).

With upper and lower members 14 and 18 separated, objects such as chlorine or bromine tablets may be placed into volumes including $V_2$ and $V_3$. Substantially filling volumes $V_2$ and $V_3$ will result in dispenser 10 floating upright (substantially vertically) in a pool or spa, with at least top 34 above the waterline. Assuming at least some of openings 74, 58, and 62 are aligned, water may flow into dispenser 10, contact the tablets, and flow from dispenser 10 back into the pool or spa.

Most typically, the chemicals initially within dispenser 10 will dissolve, abrade, or otherwise be removed from dispenser 10 over a period of time. As this activity occurs, lower member 18 (in particular) becomes lighter, with its buoyancy increasing toward that of upper member 14 (in which float 46 is positioned). The result is that dispenser 10 begins to rotate in the water through approximately ninety degrees to a more horizontal position, with portions of both upper and lower members 14 and 18 visible above the water surface. This visibility signals the likely need to remove dispenser 10 from the water and insert new tablets (or other chemical forms) therein.

Members 14 and 18 preferably are made of plastics such as, but not limited to, polypropylene. Float 46 preferably is either air or a foam material such as, but again not limited to, expanded polystyrene. Further, directional terms such as "upper," "lower," "top," and "bottom" are not intended necessarily to be absolute, as in some circumstances dispenser 10 could be oriented with a "bottom" above a "top," for example, or a "lower" member above an "upper" one. The foregoing is thus provided for purposes of illustrating, explaining, and describing embodiments of the present invention. Modifications and adaptations to these embodiments will be apparent to those skilled in the art and may be made without departing from the scope or spirit of the invention. Additionally, the contents of the Powell, Davey, and Alexander patents are incorporated herein in their entireties by this reference.

What is claimed is:

1. A chemical dispenser for a body of water, comprising:
   a. an upper member defining a first interior volume configured to include material that is more buoyant than water;
   b. a lower member defining an interior volume configured to receive water-treatment chemicals; and
   c. means permitting at least some of the water-treatment chemicals to exit the lower member in use of the dispenser so as to effect rotation of the dispenser from a generally vertical orientation to a generally horizontal orientation; and in which (i) the upper member and the lower member are detachably connected, (ii) the lower member is generally cylindrical in shape, and (iii) the upper member includes a first portion that is generally conical in shape and configured to fit in the interior volume of the lower member prior to use of the dispenser.

2. A dispenser according to claim 1 in which the upper member further defines a second interior volume configured to receive water-treatment chemicals.

3. A dispenser according to claim 1 in which the lower member terminates in a floor which may include at least one fill and drain hole.

4. A dispenser according to claim 1 in which the water-treatment chemicals comprise a solid material and when the dispenser is oriented generally vertically in use, the solid material is beneath and generally vertically aligned with the material that is more buoyant than water.

5. A dispenser according to claim 4 in which the material that is more buoyant than water comprises a float.

6. A dispenser according to claim 4 in which the material that is more buoyant than water comprises air.

7. A dispenser according to claim 4 in which the solid material comprises at least one chlorine or bromine tablet.

8. A dispenser according to claim 1 in which connection and detachment of the upper and lower members occurs via rotation of one relative to the other.

9. A dispenser according to claim 2 further comprising a divider separating the first and second interior volumes.

10. A chemical dispenser for a body of water, comprising:
    a. an upper member (i) defining an interior volume configured to include material that is more buoyant than water and (ii) having a portion that is generally conical in shape;
    b. a lower member (i) defining an interior volume configured to receive (A) the generally conical portion of the upper member prior to use of the dispenser and (B) water-treatment chemicals during use of the dispenser, (ii) rotatable relative to the upper member to effect connection thereto and detachment therefrom, and (iii) generally cylindrical in shape; and
    c. means permitting at least some of the water-treatment chemicals to exit the lower member in use of the dispenser so as to effect rotation of the dispenser from a generally vertical orientation to a generally horizontal orientation, such means comprising a plurality of openings in each of the upper and lower members, alignment of which openings depends on the rotational position of the upper member relative to the lower member.

* * * * *